United States Patent
Lee et al.

(10) Patent No.: US 7,492,982 B2
(45) Date of Patent: Feb. 17, 2009

(54) OPTICAL MODULE

(75) Inventors: Jeong-Seok Lee, Anyang-si (KR);
Joong-Wan Park, Suwon-si (KR);
Yu-Dong Bae, Suwon-si (KR); In-Kuk Yun, Suwon-si (KR); Jeong-Hwan Song, Seoul (KR); Seung-Woo Kim, Anyang-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/646,739

(22) Filed: Dec. 28, 2006

(65) Prior Publication Data

US 2007/0183719 A1    Aug. 9, 2007

(30) Foreign Application Priority Data

Feb. 6, 2006    (KR) ............... 10-2006-0011135

(51) Int. Cl.
*G02B 6/12* (2006.01)
*G02B 6/36* (2006.01)

(52) U.S. Cl. ................................. 385/14; 385/88
(58) Field of Classification Search ............ 385/14, 385/88
See application file for complete search history.

(56) References Cited

U.S. PATENT DOCUMENTS

| 4,427,879 A * | 1/1984 | Becher et al. ............ 250/215 |
| 4,836,635 A * | 6/1989 | De Amorim ............... 385/89 |
| 5,416,861 A * | 5/1995 | Koh et al. ................. 385/14 |
| 5,475,215 A * | 12/1995 | Hsu .................... 250/227.11 |
| 5,745,631 A * | 4/1998 | Reinker .................. 385/132 |
| 6,343,164 B1 * | 1/2002 | Robertsson et al. ........ 385/14 |
| 6,910,812 B2 * | 6/2005 | Pommer et al. ............ 385/92 |
| 6,987,906 B2 * | 1/2006 | Nakama et al. ............ 385/31 |
| 7,140,941 B2 * | 11/2006 | Green et al. .............. 445/24 |
| 7,184,617 B2 * | 2/2007 | Korenaga et al. .......... 385/14 |
| 2002/0097962 A1 * | 7/2002 | Yoshimura et al. ......... 385/50 |
| 2002/0137245 A1 * | 9/2002 | Kitamura et al. .......... 438/22 |
| 2003/0034538 A1 * | 2/2003 | Brophy et al. ............ 257/444 |
| 2003/0201462 A1 * | 10/2003 | Pommer et al. ........... 257/200 |
| 2004/0096152 A1 * | 5/2004 | Nakama et al. ............ 385/31 |
| 2004/0252951 A1 * | 12/2004 | Nagasaka et al. .......... 385/88 |
| 2005/0046011 A1 * | 3/2005 | Chen et al. .............. 257/705 |
| 2005/0089292 A1 * | 4/2005 | Kinoshita ............... 385/129 |
| 2005/0105860 A1 * | 5/2005 | Oono et al. .............. 385/88 |
| 2005/0201693 A1 * | 9/2005 | Korenaga et al. .......... 385/89 |
| 2006/0016962 A1 * | 1/2006 | Ohtorii ................ 250/208.2 |
| 2006/0120666 A1 * | 6/2006 | Ohtorii ................... 385/33 |
| 2006/0126995 A1 * | 6/2006 | Glebov et al. ............ 385/15 |
| 2007/0019914 A1 * | 1/2007 | Ohtsu et al. ............. 385/89 |
| 2007/0058378 A1 * | 3/2007 | Moriyama et al. ........ 362/378 |
| 2007/0104416 A1 * | 5/2007 | Shimizu et al. ........... 385/14 |

FOREIGN PATENT DOCUMENTS

| KR | 2001-24407 | 3/2001 |
| KR | 2005-7459  | 1/2005 |

* cited by examiner

*Primary Examiner*—K. Cyrus Kianni
(74) *Attorney, Agent, or Firm*—Cha & Reiter, LLC

(57) ABSTRACT

An optical module comprises a waveguide, at least one optical transducer positioned on the waveguide for transducing an optical signal into an electric signal or an electric signal into an optical signal and a connection socket seated on the waveguide, the optical transducer being mounted in the connection socket.

5 Claims, 5 Drawing Sheets

OPTICAL MODULE

CLAIM OF PRIORITY

This application claims the benefit of the earlier filing date, pursuant to 35 USC 119(e), to that patent application entitled "Optical module" filed with the Korean Intellectual Property Office on Feb. 6, 2006 and assigned Serial No. 2006-11135, the contents of which are hereby incorporated by reference.

BACKGROUND OF THE INVENTION

1. Field of the Invention

The present invention relates to an integrated optical module, and more particularly, to an optical module in which a light source and a photodetector are connected with each other by a flexible printed circuit board.

2. Description of the Related Art

Miniaturized portable digital terminals that possess complicated functionalities and various configurations are well-known and have been disclosed in the art. These digital terminals include products such as mobile telephones, digital cameras, digital camcorders, game consoles, PMP (portable media player), etc. These digital terminals typically are of a miniature size, so as to be conveniently carried, while being capable of processing large amounts of data. In consideration of these facts, the miniaturized digital terminals currently on the market are configured to be connected by a serial interface using an FPCB (flexible printed circuit board) as a transmission medium.

Specifically, the serial interface using the FPCB is required to have high operational reliability with a minimized power consumption level. In the case of using a conventional FPCB as a signal transmission medium, while maintaining a desired data processing amount, limitations exist in increasing data transmission speed as such increases in speed cause comparable increases in the generation electromagnetic interference (EMI). Matsushita Electric, for example, has disclosed an optical connection structure in which a polymide optical waveguide is formed in a conventional FPCB and an optical device is flip-chip bonded to the polymide optical waveguide through patterning as a method for overcoming the aforementioned generation of EMI.

The optical connection structure disclosed by Matsushita includes a light source for transmitting data, a photodetector for receiving data, and an optical waveguide coupled to a FPCB that is used as a transmission media for transmitting and receiving data. The light source and the photodetector correspond to each other in a one-to-one relationship and a plurality of light sources and photodetectors may be used as the situation demands.

However, the optical connection structure disclosed by Matsushita has a drawback in that it is difficult to achieve a high degree of operational reliability between the optical devices when a plurality of optical devices are integrated on the FPCB. Also, in the region where the existing FPCB and the optical device are connected with each other, the volume of the entire configuration increases.

SUMMARY OF THE INVENTION

Accordingly, the present invention has been made to solve the above-mentioned problems occurring in the prior art, and an object of the present invention is to provide an optical module which has a miniature size and can stably connect an optical device with an FPCB.

In order to achieve the above object, according to the present invention, there is provided an optical module comprising a waveguide, at least one optical transducer positioned on the waveguide for transducing an optical signal into an electric signal or an electric signal into an optical signal and a connection socket seated on the waveguide, the optical transducer being mounted in the connection socket.

BRIEF DESCRIPTION OF THE DRAWINGS

The above and other objects, features and advantages of the present invention will be more apparent from the following detailed description when taken in conjunction with the accompanying drawings, in which.

DETAILED DESCRIPTION OF THE INVENTION

Hereinafter, a preferred embodiment of the present invention will be described with reference to the accompanying drawings. For the purposes of clarity and simplicity, only the parts necessary for understanding of the operations and functions of the present invention will be explained, and the explanation for the other parts will be omitted so that they do not make the subject matter of the present invention unclear.

Figure 1:
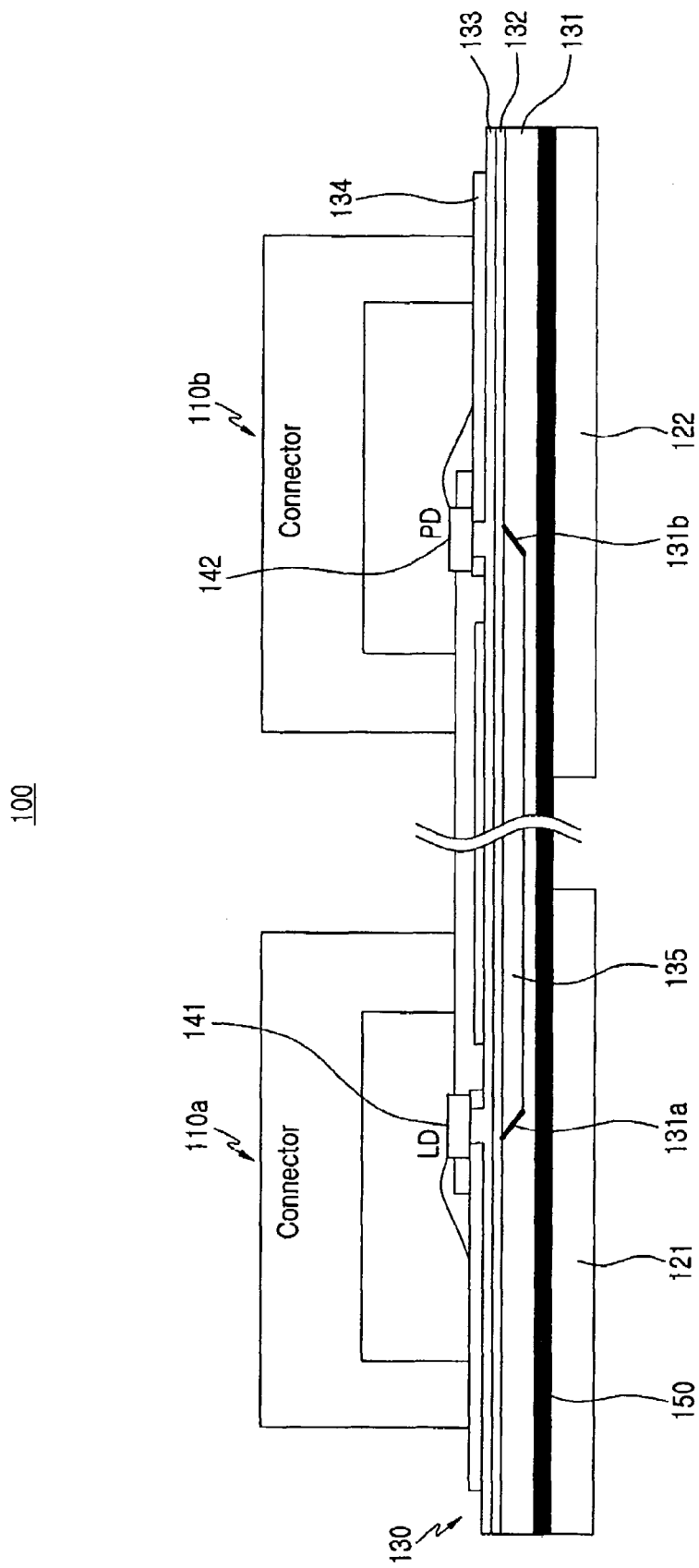
FIG. 1 is a cross-sectional view illustrating the configuration of an optical module in accordance with a first embodiment of the present invention.

FIG. 1 is a view illustrating the configuration of an optical module in accordance with a first embodiment of the present invention. Referring to FIG. 1, the optical module 100 according to this embodiment of the present invention includes a flexible printed circuit board 150, a waveguide 130 positioned on the flexible printed circuit board 150, one or more optical transducers 141 and 142 positioned on the waveguide 130 for transducing an optical signal into an electric signal or an electric signal into an optical signal, connection sockets 110a and 110b seated on the waveguide 130 to mount the optical transducers 141 and 142, and ridged layers 121 and 122 positioned under the flexible printed circuit board 150.

The waveguide 130 includes a polymer layer 133, a copper layer 134 formed on the polymer layer 133 and including electrical circuit patterns, and a lower clad 131, a core 135 and an upper clad 132 which are formed under the polymer layer 133. The optical transducers 141 and 142 are electrically connected with each other on the upper surface of the copper layer 134 so to be capable of receiving and emitting light.

The core 135 is positioned between the upper clad 132 and lower clad 131 and transmits light applied thereto. Reflection mirrors 131a and 131b reflect incident light to the inside and outside of the core 135 and are placed at respective ends of the core 135 through which light is inputted and outputted.

The optical transducers 141 and 142 employ a light source for generating light and a photodetector for detecting generated light, and are mounted in the connection sockets 110a and 110b respectively. The connection sockets 110a and 110b are seated on the copper layer 134. The light generated by the light source in one of the optical transducers 141, 142, passes through the polymer layer 133 and the copper layer 134 and is reflected to the inside of the core 135 by one reflection mirror 131a formed at the interface between the core 135 and the lower clad 131, and is then reflected by the other reflection mirror 131b to the corresponding photodetector in the other transducer.

The flexible printed circuit board 150 is positioned below the waveguide 130, and can perform the function of transmitting optical, power and analog type electrical signals. The positions of the flexible printed circuit board 150 and the waveguide 130 can be changed depending upon the optical connection pattern of the optical transducers 141 and 142.

Figure 2:
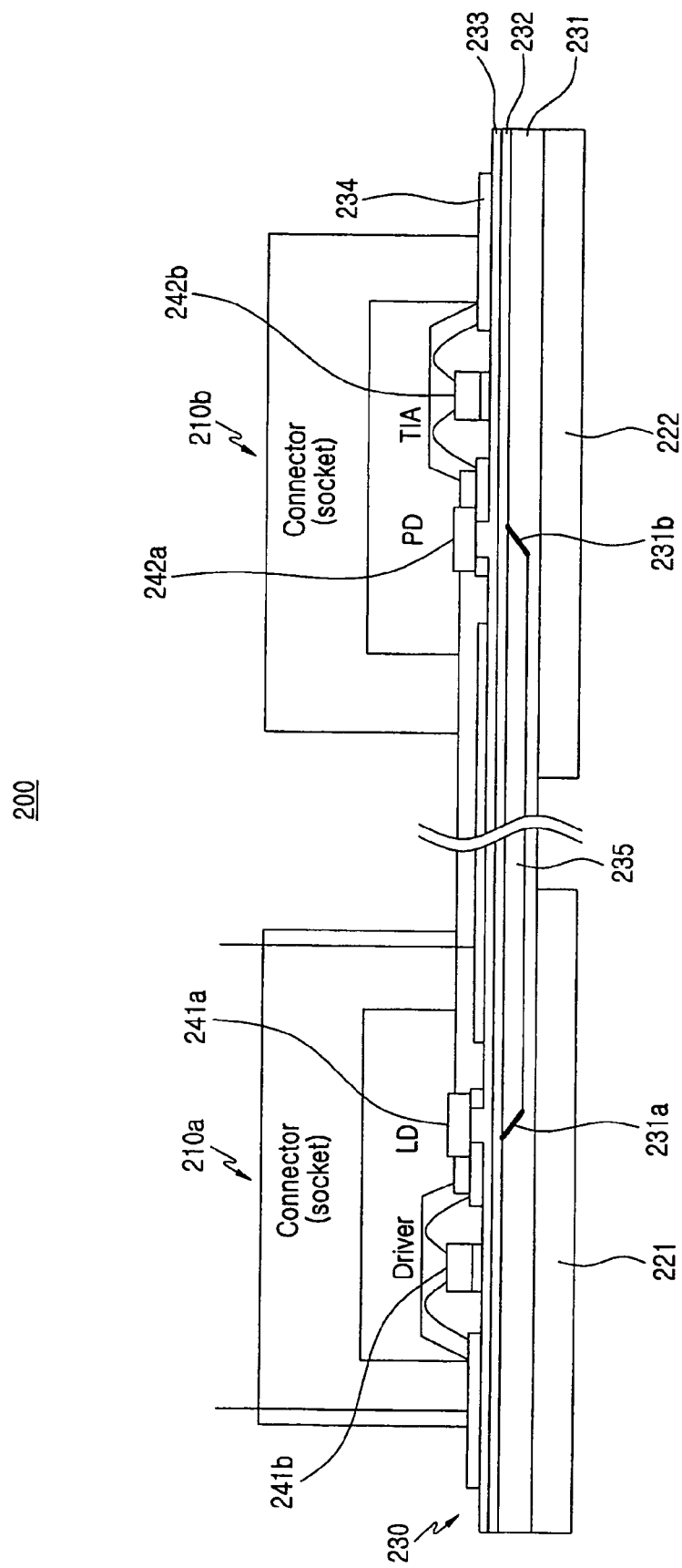
FIG. 2 is a cross-sectional view illustrating the configuration of an optical module in accordance with a second embodiment of the present invention.

FIG. 2 is a view illustrating the configuration of an optical module in accordance with a second embodiment of the present invention. Referring to FIG. 2, the optical module 200 according to this embodiment of the present invention includes a waveguide 230, optical transducers 241a and 242a, positioned on the waveguide 230, for transducing an optical signal into an electric signal or an electric signal into an optical signal, connection sockets 210a and 210b seated on the waveguide 230, to mount the optical transducers 241a and 242a, respectively, driving circuits 241b and 242b mounted in the respective connection sockets 210a and 210b, for driving the respective optical transducers 241a and 242a, and ridged substrates 221 and 222.

In the optical module 200 according to this embodiment of the present invention, the optical transducers 241a and 242a, as well as the driving circuits 241b and 242b, for driving the respective optical transducers 241a and 242a, are mounted in the connection socket 210a and 210b. The waveguide 230 includes a polymer layer 233, a copper layer 234 formed on the polymer layer 233, lower and upper clads 231 and 232, respectively, formed under the polymer layer 233, and a core 235 having reflection mirrors 231a and 231b formed at the interfaces between the core 235 and the lower clad 231.

On the upper surface of the copper layer 234, electrical circuit patterns are formed (not shown) such that the optical transducers 241a and 242a are electrically connected with each other and are capable of receiving and emitting light. The driving circuits 241b and 242b, for driving the optical transducers 241a and 242a, are electrically connected to the corresponding transducer. For the driving circuits 241b and 242b, is would be recognized by those skilled in the art that a driver or a trans impedance amp can be used.

Figure 3:
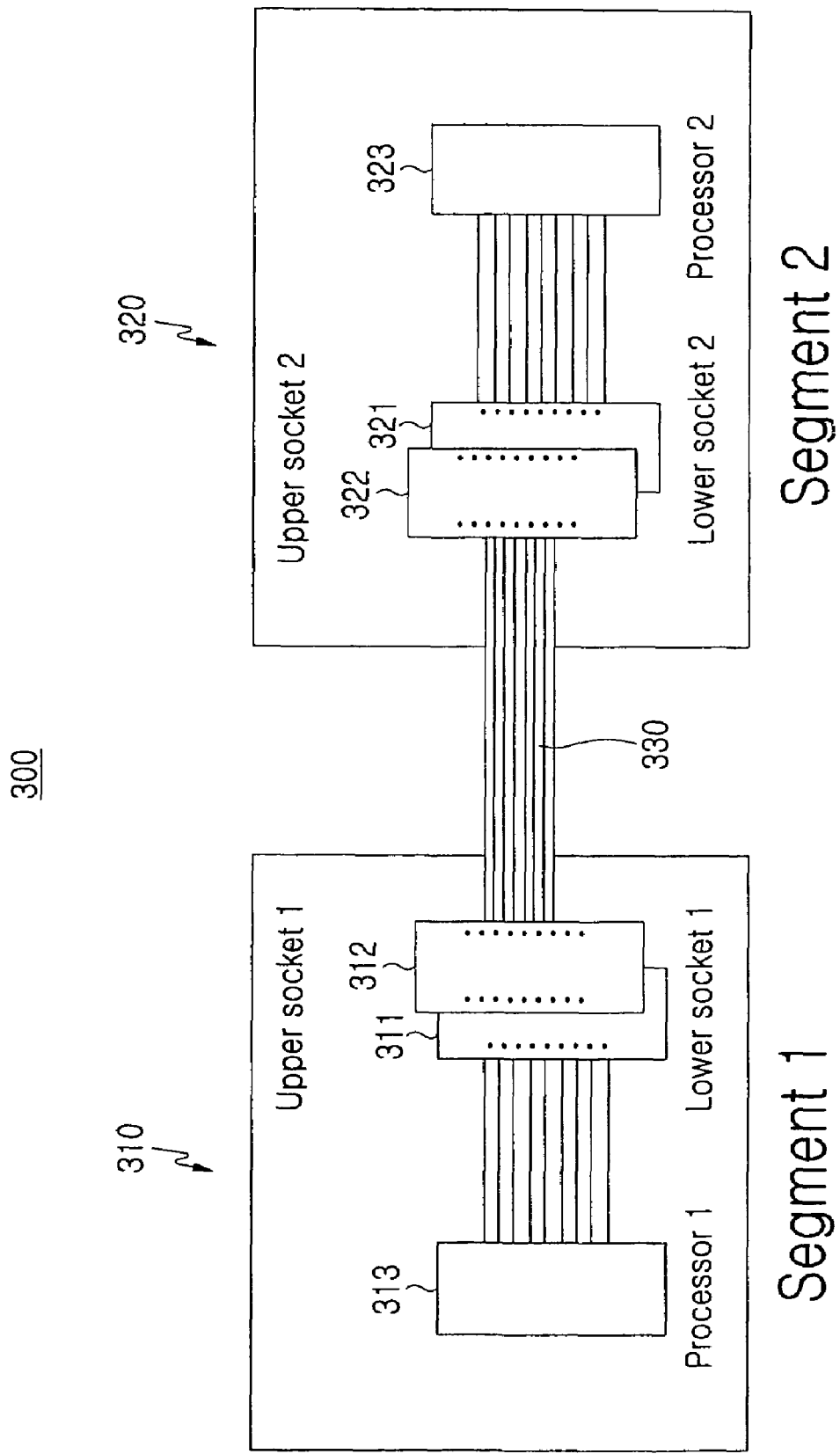
FIG. 3 is a top view illustrating a connection structure using an optical module in accordance with a third embodiment of the present invention.

FIG. 3 is a top view illustrating a connection structure using an optical module in accordance with a third embodiment of the present invention. Referring to FIG. 3, the connection structure 300 according to this embodiment of the present invention. This embodiment includes first and second sections 310 and 320 for transmission and reception of a signal, and a waveguide 330 for electrically and/or optically connecting the first and second sections 310 and 320. The waveguide 330 is configured in the same manner as described with regard to the first and second embodiments of the present invention.

The first and second sections 310 and 320 comprise upper sockets 312 and 322 and lower sockets 311 and 321, respectively, for mounting corresponding optical transducers, and separate processors 313 and 323, respectively, for controlling the optical transducers mounted in the upper and lower sockets 312 and 322 or driving circuits.

Figure 4A:
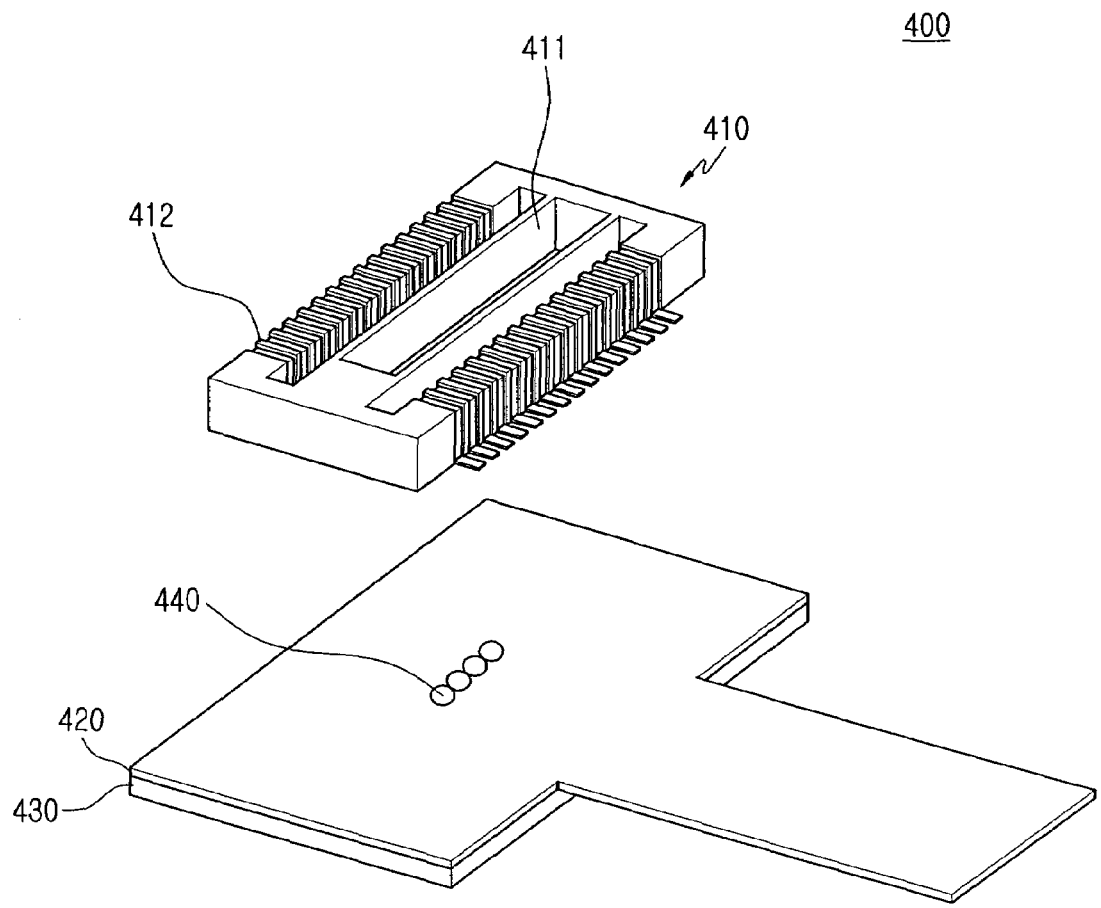
FIGS. 4a and 4b are views illustrating an optical module including a socket which is opened on the upper and lower ends thereof, in accordance with a fourth embodiment of the present invention.
Figure 4B:
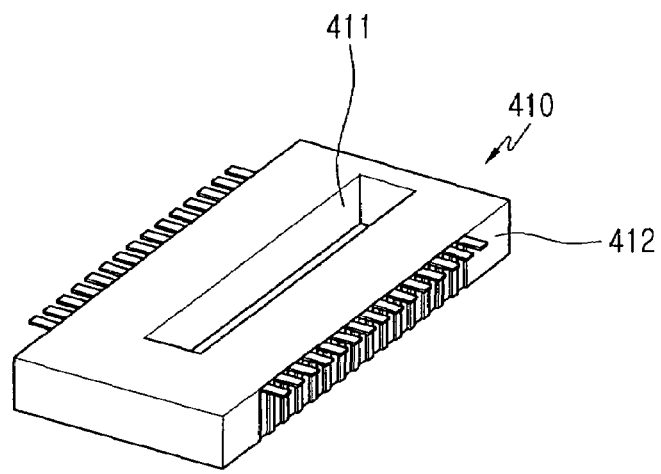

FIGS. 4a and 4b are views illustrating an optical module in accordance with a fourth embodiment of the present invention. FIG. 4a is an exploded perspective view illustrating a connection socket 410, a waveguide 420 positioned under the connection socket 410, and a flexible printed circuit board 430 positioned under the waveguide 420.

FIG. 4b is a bottom perspective view of the connection socket 410 shown in FIG. 4a. The optical module 400 according to this embodiment of the present invention includes the connection socket 410, the waveguide 420 and the flexible printed circuit board 430.

The connection socket 410 has an opening 411 that is opened through the upper and lower ends thereof, such that a corresponding optical transducer can be inserted through the opening 411. The connection socket 410 is seated on the upper surface of the waveguide 420.

The waveguide 420 may be composed of polymer and copper layers, as previously described, which are sequentially stacked one upon the other, and a core which is surrounded by a clad bonded to the lower surface of the polymer layer. Electrical circuit patterns can be formed on the upper surface of the polymer and copper layers also as previously described. A groove 440 for seating corresponding optical transducers is formed on the waveguide 420. In addition to groove 440, a pattern (not shown) for seating the optical transducer can be formed on the waveguide 420.

Figure 5A:
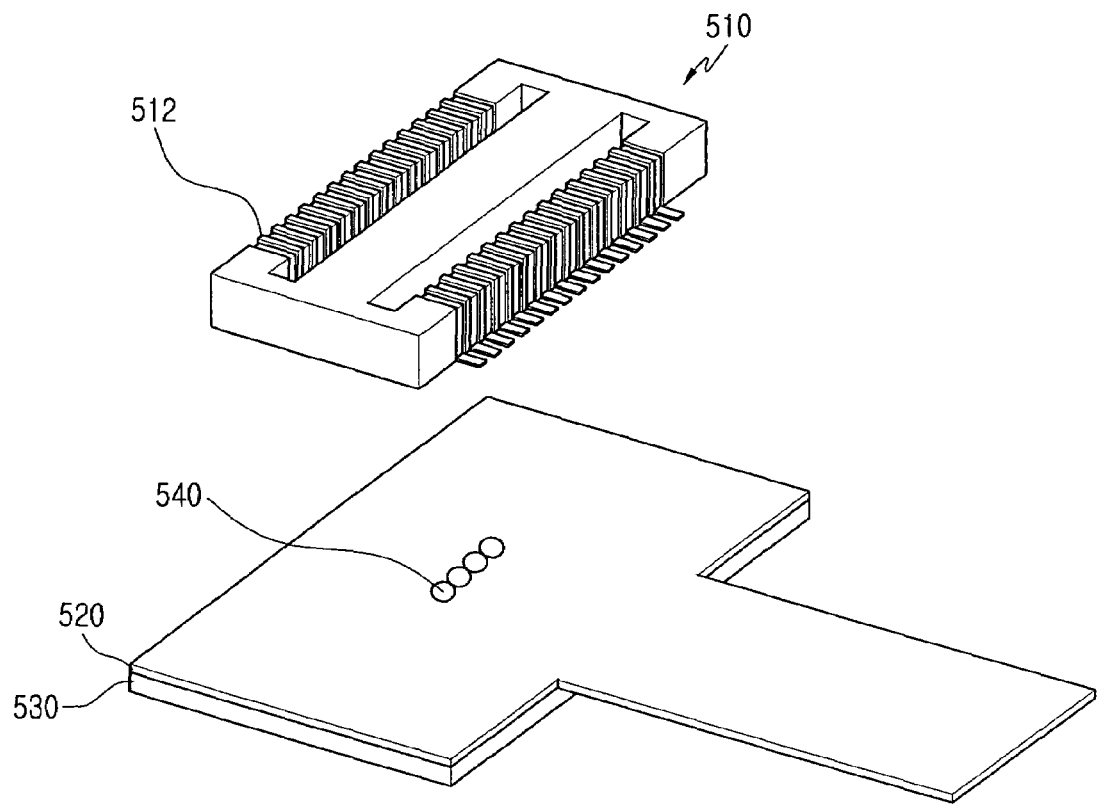
FIGS. 5a and 5b are views illustrating an optical module including a socket which is closed on the upper end thereof and is defined with a groove on the surface thereof facing a flexible printed circuit board.
Figure 5B:
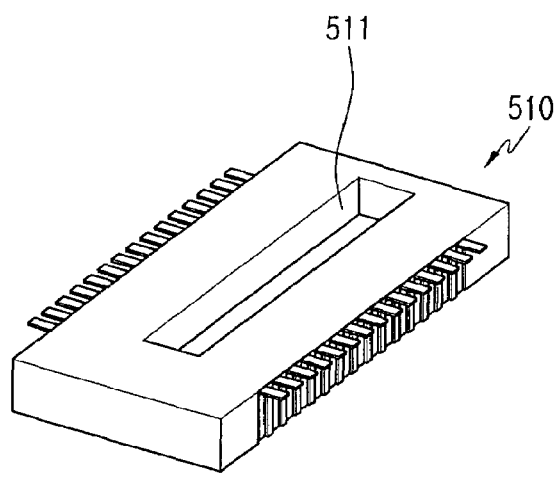

FIGS. 5a and 5b are views illustrating an optical module including a socket which is closed on the upper surface thereof and is defined with a groove on the surface thereof facing a flexible printed circuit board. The connection socket 510 shown in FIG. 5a is closed on the upper end thereof. Referring to FIG. 5b, the lower surface of the connection socket 510 that would be facing waveguide 520 is includes groove 511 through which an optical transducer is inserted. A flexible printed circuit board 530 is positioned under the waveguide 520.

In this embodiment, the groove 511 through which the corresponding optical transducer is inserted is defined to face the upper surface of the waveguide 520. The waveguide 520 comprises polymer and copper layers which are sequentially stacked one upon the other, and a core which is surrounded by a clad as previously described. A groove is defined on the polymer and copper layers so that the corresponding optical transducer can be seated.

As is apparent from the above description, the optical module according to the present invention provides for the transmission of a signal at a high speed between two devices without electrical noise. Also, in the present invention, discloses an optical device mounted to a flexible optical circuit board that comprises a PCB (printed circuit board) having a ridge on the lower surface thereof. Further, because the present invention can be applied without requiring an additional space, thus, the entire configuration can be miniaturized.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An optical module comprising:
   a waveguide comprising:
      a polymer layer,
      a copper layer formed on the polymer layer and including electrical circuit patterns thereon,
   a lower clad, a core and an upper clad formed under the polymer layer; and
      at least two optical transducers positioned in a corresponding groove in said copper layer and said polymer layer on the waveguide, at least a first optical transducer of said two optical transducers for converting an electrical signal into an optical signal passing through said copper layer and said polymer layer for travel through the waveguide, and at least a second transducer for receiving an optical signal, passing through said polymer layer and copper layer, from the waveguide and converting the optical signal into an electrical signal; and at least one connection socket seated on the copper layer of the waveguide in which the two optical transducers are mounted within corresponding ones of the connection sockets, said connection socket including a plurality of electrical connections extending from a top of said connection to a bottom of said connection wherein selected ones of the electrical connectors are connected to said copper layer to provide a shielding from electrical noise.

2. The optical module as set forth in claim 1, further comprising:
   a driving circuit for driving a corresponding optical transducer.

3. The optical module as set forth in claim 2, wherein the driving circuit for driving a corresponding optical transducer is mounted in the connection socket.

4. The optical module as set forth in claim 1, wherein the connection socket is opened trough upper and lower ends at a center portion thereof on which the optical transducer is mounted.

5. The optical module as set forth in claim 1, fUrther comprising:
   a flexible printed circuit board positioned under the waveguide; and
   a ridge board positioned under the flexible printed circuit board.

* * * * *